(12) United States Patent
Qian et al.

(10) Patent No.: US 12,231,563 B2
(45) Date of Patent: Feb. 18, 2025

(54) SECURE COMPUTATION AND COMMUNICATION

(71) Applicant: Lemon Inc., Grand Cayman (KY)

(72) Inventors: Haohao Qian, Beijing (CN); Jian Du, Culver City, CA (US); Qiang Yan, Beijing (CN)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/297,339

(22) Filed: Apr. 7, 2023

(65) Prior Publication Data
US 2024/0340178 A1 Oct. 10, 2024

(51) Int. Cl.
*H04L 9/30* (2006.01)
*G06F 16/2455* (2019.01)
*G06F 16/25* (2019.01)

(52) U.S. Cl.
CPC ........ *H04L 9/3066* (2013.01); *G06F 16/2456* (2019.01); *G06F 16/258* (2019.01); *H04L 2209/46* (2013.01)

(58) Field of Classification Search
CPC ............... H04L 9/3066; H04L 2209/46; G06F 16/2456; G06F 16/258
See application file for complete search history.

(56) References Cited

U.S. PATENT DOCUMENTS

| | | | |
|---|---|---|---|
| 7,058,603 B1 | 6/2006 | Rhiando | |
| 9,652,622 B2 | 6/2017 | Garfinkle et al. | |
| 10,289,816 B1 | 5/2019 | Malassenet | |
| 11,522,688 B2 | 12/2022 | Goodsitt et al. | |
| 11,593,510 B1 | 2/2023 | Knox | |
| 11,704,431 B2 | 7/2023 | Kraus | |
| 2004/0179686 A1* | 9/2004 | Matsumura | H04L 9/085 380/44 |
| 2010/0131764 A1 | 5/2010 | Goh | |

(Continued)

FOREIGN PATENT DOCUMENTS

| | | | | |
|---|---|---|---|---|
| CN | 102752794 A | * | 10/2012 | ........ H04W 72/1278 |
| CN | 116049626 A | | 5/2023 | |

OTHER PUBLICATIONS

Buddhavarapu et al., "Private matching for compute", Cryptology ePrint Archive, 2020, https://eprint.iacr.org/2020/599.

(Continued)

*Primary Examiner* — Fatoumata Traore
*Assistant Examiner* — Carlton Johnson
(74) *Attorney, Agent, or Firm* — Fish & Richardson P.C.

(57) ABSTRACT

Methods and systems for secure computation and communication are provided. The method includes transforming identifications of a first dataset using a first transforming scheme, and transforming attributes of the first dataset using a second transforming scheme. The method also includes dispatching the transformed first dataset, receiving a second dataset, transforming identifications of the received second dataset, dispatching the identifications of the transformed received second dataset, and receiving a set of identifications. The method further includes generating a first intersection of the received set of identifications and the transformed received second dataset, generating a first share based on the first intersection, receiving a second share, and constructing a result based on the first share and the second share.

20 Claims, 9 Drawing Sheets

(56) References Cited

U.S. PATENT DOCUMENTS

| | | | |
|---|---|---|---|
| 2011/0202764 | A1 | 8/2011 | Furukawa |
| 2012/0143922 | A1 | 6/2012 | Rane |
| 2013/0212690 | A1 | 8/2013 | Fawaz |
| 2016/0150047 | A1* | 5/2016 | O'Hare ............... G06F 11/1469 713/168 |
| 2018/0101697 | A1 | 4/2018 | Rane |
| 2019/0065775 | A1 | 2/2019 | Klucar, Jr. |
| 2019/0244138 | A1 | 8/2019 | Bhowmick |
| 2019/0361794 | A1 | 11/2019 | Maksyutov |
| 2020/0250335 | A1 | 8/2020 | Hockenbrocht |
| 2020/0401726 | A1 | 12/2020 | Lim et al. |
| 2021/0073677 | A1 | 3/2021 | Peterson |
| 2021/0173856 | A1 | 6/2021 | Chitnis |
| 2021/0258149 | A1 | 8/2021 | Kawaguchi |
| 2021/0303647 | A1* | 9/2021 | Westmoreland ...... H04L 67/535 |
| 2021/0328762 | A1 | 10/2021 | Becher et al. |
| 2021/0336771 | A1* | 10/2021 | Mukherjee ............ H04L 9/0838 |
| 2021/0360010 | A1 | 11/2021 | Zaccak |
| 2021/0399874 | A1* | 12/2021 | Polyakov ................... H04L 9/30 |
| 2022/0100899 | A1* | 3/2022 | Saillet ................. G06F 21/6254 |
| 2022/0138348 | A1 | 5/2022 | Bernau |
| 2022/0244988 | A1 | 8/2022 | Zhang |
| 2022/0277097 | A1 | 9/2022 | Cabot |
| 2022/0335450 | A1 | 10/2022 | Fenton |
| 2022/0405800 | A1* | 12/2022 | Walcott .............. G06Q 30/0255 |
| 2023/0045553 | A1 | 2/2023 | Deshpande |
| 2023/0125887 | A1 | 4/2023 | Habite |
| 2023/0146259 | A1 | 5/2023 | Liktor |
| 2023/0017374 | A1 | 6/2023 | Boehler |
| 2023/0214684 | A1 | 7/2023 | Wang |

OTHER PUBLICATIONS

Guo et al., "Birds of a Feather Flock Together: How Set Bias Helps to Deanonymize You via Revealed Intersection Sizes", 31st USENIX Security Symposium, Aug. 10-12, 2022, Boston, MA, USA, https://www.usenix.org/conference/usenixsecurity22/presentation/guo.

Ion et al., "On Deploying Secure Computing: Private Intersection-Sum-with-Cardinality", 2020 IEEE European Symposium on Security and Privacy (EuroS&P), Date of Conference: Sep. 7-11, 2020, Date added to IEEE Xplore: Nov. 2, 2020, https://www.researchgate.net/publication/346584438_On_Deploying_Secure_Computing_Private_Intersection-Sum-with-Cardinality.

Chandran et al., "Circuit-PSI with Linear Complexity via Relaxed Batch OPPRF", Cryptology ePrint Archive, received Jan. 12, 2021, https://eprint.iacr.org/2021/034.

Pinkas et al., "SpOT-Light: Lightweight Private Set Intersection from Sparse OT Extension", Cryptology ePrint Archive, received Jun. 3, 2019, https://eprint.iacr.org/2019/634.

Chase et al., "Secret Shared Shuffle", Cryptology ePrint Archive, received Nov. 22, 2019, https://eprint.iacr.org/2019/1340.

Mohassel et al., " How to Hide Circuits in MPC: An Efficient Framework for Private Function Evaluation", Cryptology ePrint Archive, received Mar. 9, 2013, https://eprint.iacr.org/2013/137.

Garimella et al., "Private Set Operations from Oblivious Switching", Cryptology ePrint Archive, received Mar. 2, 2021, https://eprint.iacr.org/2021/243.

Dwork et al., "Differential Privacy and Robust Statistics", Association for Computing Machinery, May 31, 2009, pp. 371-380, https://dl.acm.org/doi/10.1145/1536414.1536466.

Dwork et al., "Differential Privacy Under Continual Observation", Association for Computing Machinery, Jun. 5, 2010, pp. 715-724, https://dl.acm.org/doi/10.1145/1806689.1806787.

Dwork et al. "Our Data, Ourselves: Privacy via Distributed Noise Generation", Advances in Cryptology—EUROCRYPT 2006: 24th Annual International Conference on the Theory and Applications of Cryptographic Techniques, St. Petersburg, Russia, May 28-Jun. 1, 2006. Proceedings 25. Springer Berlin Heidelberg, 2006, https://doi.org/10.1007/11761679_29.

Office Action dated Jun. 12, 2023 issued in the corresponding U.S. Appl. No. 18/297,376.

Case, Benjamin et al. "The Privacy-preserving Padding Problem: Non-negative Mechanisms for Conservative Answers with Differential Privacy." 20 pages. Oct. 15, 2021. https://arxiv.org/abs/2110.08177.

Office Action dated Jul. 11, 2023 issued in the corresponding U.S. Appl. No. 18/297,389.

Office Action dated Jun. 14, 2023 issued in the corresponding U.S. Appl. No. 18/297,405.

Kairouz, Peter, Sweoong Oh, and Pramod Viswanath. "The composition theorem for differential privacy." International Conference on machine learning. PMLR, 2015 (Year: 2015).

Office Action dated Jun. 20, 2023 issued in the corresponding U.S. Appl. No. 18/297,424.

Notice of Allowance dated Aug. 2, 2023 issued in the corresponding U.S. Appl. No. 18/297,424.

Office Action dated Jul. 12, 2023 issued in the corresponding U.S. Appl. No. 18/297,447.

Du et al. DP-PSI: Private and secure set intersection, Aug. 28, 2022, Cornel University, https://doi.org/10.48550/arXiv.2208.13249V1, p. 1-9. (Year: 2022).

Notice of Allowance dated Jul. 25, 2023 issued in the corresponding U.S. Appl. No. 18/297,530.

Notice of Allowance dated Aug. 2, 2023 issued in the corresponding U.S. Appl. No. 18/297,545.

Notice of Allowance dated Aug. 30, 2023 issued in the corresponding U.S. Appl. No. 18/297,376.

Notice of Allowance dated Aug. 30, 2023 issued in the corresponding U.S. Appl. No. 18/297,405.

International Search Report issued in PCT/SG2024/050217, dated May 18, 2024.

Secure Multiparty Computation (part 2). Sep. 29, 2016, Retrieved on May 10, 2024, from https://web.archive.org/web/20160929124624/https://research.cyber.ee/~peeter/teaching/krprot09s/mpc2new.pdf, pp. 35-37.

Agrawal S. et al., Multi-Party Functional Encryption. Theory of Cryptography. TCC 2021, Nov. 4, 2021, vol. 13043, pp. 1-70, Retrieved on May 10, 2024.

* cited by examiner

SECURE COMPUTATION AND COMMUNICATION

FIELD

The embodiments described herein pertain generally to private and secure computation and communication. More specifically, the embodiments described herein pertain to private inner join and secure computation and communication of data from multiple data owners.

BACKGROUND

Inner join of records of datasets from multiple data owners may be a prerequisite for subsequent operations for many applications, including the collection of the aggregate statistics, the training of distributed machine learning models, etc. For instance, when one party owns elements' feature data or attribution data and another party owns the elements' label or identification, there is a need for a private inner join that does not reveal the intersection before conducting the distributed or federated training in machine learning applications.

Existing private-matching-for-computing schemes may complete private identity matching without revealing the intersection of datasets or database of two parties, and generate secure sharing of the two-party data after the member or user identifications in the datasets being matched for subsequent multi-party computation.

SUMMARY

It is to be understood that the communication complexity and the computational complexity of an existing scheme can be relatively high, and an optimized scheme needs to be designed for privacy matching and computation for the amount of big data. Features in the embodiments disclosed herein may help solve a problem of privacy matching of two-party or multi-party data in a two-party or multi-party secure computation, and generating the secure sharing of data associated with the intersection of datasets from the two or more parties. Features in the embodiments disclosed herein may provide a private and secure protocol based on various algorithms such as a computational complexity assumption (e.g., the decisional Diffie-Hellman assumption, etc.), an additively homomorphic encryption algorithm, etc., and may effectively reduce the communication complexity and the computational complexity compared with the existing scheme.

It is to be understood that in a semi-honest security model, all the parties may follow the private join operation and the computing protocol honestly while trying to extract more information from or regarding the other party's input dataset. Features in the embodiments disclosed herein may provide security with regard to a semi-honest and computationally bounded adversary.

In one example embodiment, a method for secure computation and communication is provided. The method includes transforming identifications of a first dataset using a first transforming scheme; transforming attributes of the first dataset using a second transforming scheme; dispatching the transformed first dataset; receiving a second dataset; transforming identifications of the received second dataset; dispatching the identifications of the transformed received second dataset; receiving a set of identifications; generating a first intersection of the received set of identifications and the transformed received second dataset; generating a first share based on the first intersection; receiving a second share; and constructing a first result based on the first share and the second share.

In another example embodiment, a secure computation and communication system is provided. The system includes a memory to store a first dataset and a processor. The processor is to transform identifications of a first dataset using a first transforming scheme; transform attributes of the first dataset using a second transforming scheme; dispatch the transformed first dataset; receive a second dataset; transform identifications of the received second dataset; dispatch the identifications of the transformed received second dataset; receive a set of identifications; generate a first intersection of the received set of identifications and the transformed received second dataset; generate a first share based on the first intersection; receive a second share; and construct a first result based on the first share and the second share.

In yet another example embodiment, a non-transitory computer-readable medium having computer-executable instructions stored thereon is provided. The instructions, upon execution, cause one or more processors to perform operations including transforming identifications of a first dataset; transforming attributes of the first dataset; dispatching the transformed first dataset; receiving a second dataset; transforming identifications of the received second dataset; dispatching the identifications of the transformed received second dataset; receiving a set of identifications; generating a first intersection of the received set of identifications and the transformed received second dataset; generating a first share based on the first intersection; receiving a second share; and constructing a first result based on the first share and the second share.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

Figure 1:
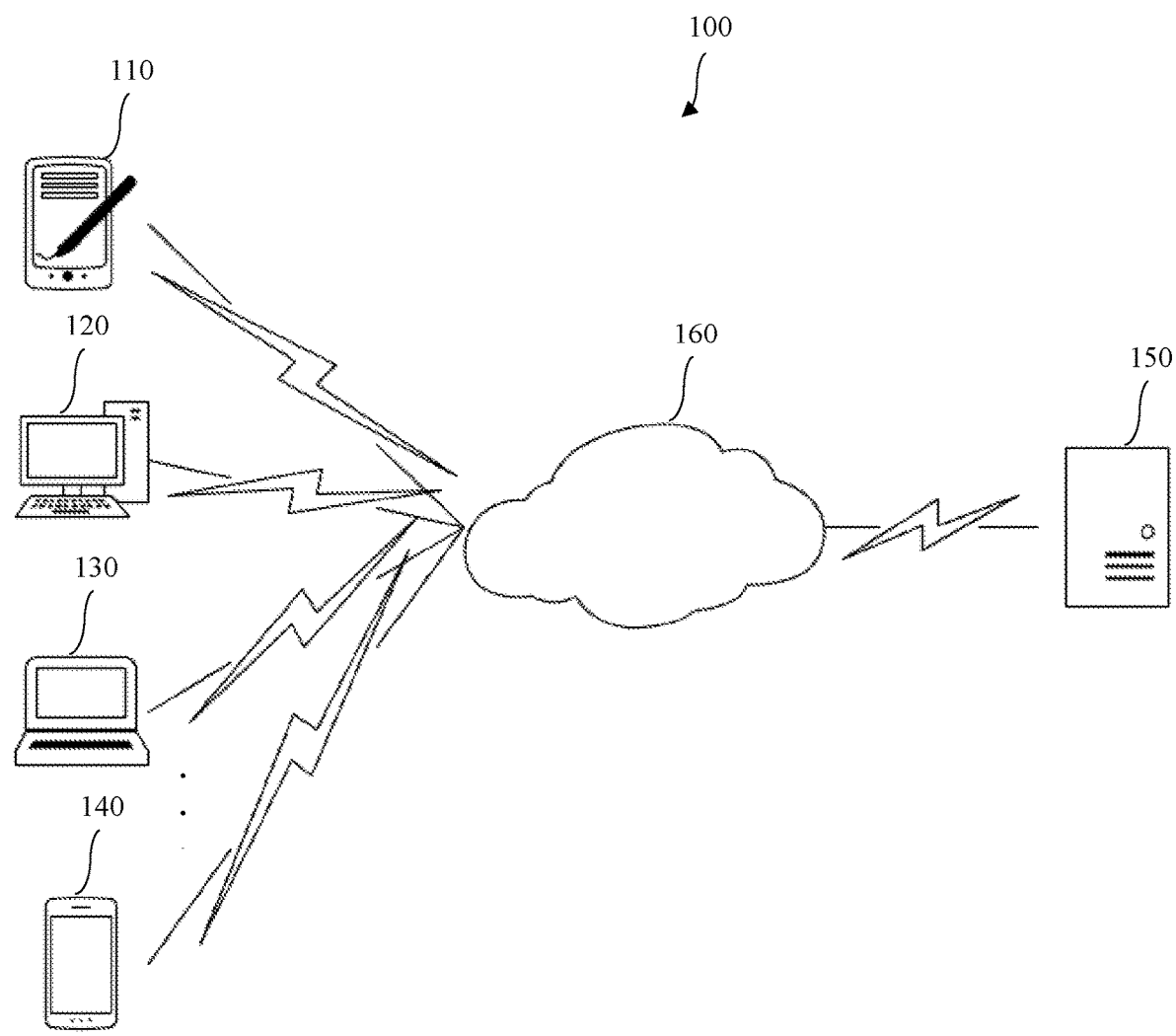
FIG. 1 is a schematic view of an example secure computation and communication system, arranged in accordance with at least some embodiments described herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, a "data set" or "dataset" is a term of art and may refer to an organized collection of data stored and accessed electronically. In an example embodiment, a dataset may refer to a database, a data table, a portion of a database or data table, etc. It is to be understood that a dataset may correspond to one or more database tables, of which every column of a database table represents a particular variable or field, and each row of the database table corresponds to a given record of the dataset. The dataset may list values for each of the variables, and/or for each record of the dataset. It is also to be understood that a dataset may also or alternatively refer to a set of related data and the way the related data is organized. In an example embodiment, each record of a dataset may include field(s) or element(s) such as one or more predefined or predetermined identifications (e.g., membership identifications, user identifications, etc., such as user's name, e-mail address, phone numbers, etc.), and/or one or more attributes or features or values associated with the one or more identifications. It is to be understood that any user's identification(s) and/or user's data described in this document are allowed, permitted, and/or otherwise authorized by the user for use in the embodiments described herein and in their proper legal equivalents as understood by those of skill in the art.

As referenced herein, "inner join" or "inner-join" is a term of art and may refer to an operation or function that includes combining records from datasets, particularly when there are matching values in a field common to the datasets. For example, an inner join may be performed with a "Departments" dataset and an "Employees" dataset to determine all the employees in each department. It is to be understood that in the resulting dataset (i.e., the "intersection") of the inner join operation, the inner join may contain the information from both datasets that is related to each other. An outer join, on the other hand, may also contain information that is not related to the other dataset in its resulting dataset. A private inner join may refer to an inner join operation of datasets of two or more parties that does not reveal the data in the intersection of datasets of the two or more parties.

As referenced herein, "hashing" may refer to an operation or function that transforms or converts an input (a key such as a numerical value, a string of characters, etc.) into an output (e.g., another numerical value, another string of characters, etc.). It is to be understood that hashing is a term of art and may be used in cyber security application(s) to access data in a small and nearly constant time per retrieval.

As referenced herein, "federated", "distributed", or "collaborative" learning or training is a term of art and may refer to a machine learning techniques that train an algorithm across multiple decentralized edge devices or servers that store local data samples, without exchanging the data samples among the devices or servers. It is to be understood that "federated" learning or training may stand in contrast to traditional centralized machine learning techniques by which all the local datasets are uploaded to one server, as well as to more classical decentralized approaches which often assume that local data samples are identically distributed. Federated learning or training may enable multiple actors to build a common, robust machine learning model without sharing data among the actors, thus addressing critical issues such as data privacy, data security, data access rights and access to heterogenous data.

As referenced herein, "MPC" or "multi-party computation" is a term of art and may refer to a field of cryptography with the goal of creating schemes for parties to jointly compute a function over the joint input of the parties while keeping respective input private. It is to be understood that, unlike traditional cryptographic tasks where cryptography may assure security and integrity of communication or storage when an adversary is outside the system of participants (e.g., an eavesdropper on the sender and/or the receiver), the cryptography in MPC may protect participants' privacy relative to each other.

As referenced herein, "ECC" or "elliptic-curve cryptography" is a term of art and may refer to a public-key cryptography based on the algebraic structure of elliptic curves over finite fields. It is to be understood that the ECC may allow smaller keys compared to non-EC cryptography to provide equivalent security. It is also to be understood that "EC" or "elliptic curve" may be applicable for key agreement, digital signatures, pseudo-random generators, and/or other tasks. Elliptic curves may be indirectly used for encryption by combining a key agreement between/among the parties with a symmetric encryption scheme. Elliptic curves may also be used in integer factorization algorithms based on elliptic curves that have applications in cryptography.

As referenced herein, "decisional Diffie-Hellman assumption" or "DDH assumption" is a term of art and may refer to a computational complexity assumption about a certain problem involving discrete logarithms in cyclic groups. It is to be understood that the DDH assumption may be used as a basis to prove the security of many cryptographic protocols.

As referenced herein, "elliptic-curve Diffie-Hellman" or "ECDH" is a term of art and may refer to a key agreement protocol or a corresponding algorithm that allows two or more parties, each having an elliptic-curve public-private key pair, to establish a shared secret over an unsecured channel. It is to be understood that the shared secret may be directly used as a key or to derive another key. It is also to be understood that the key, or the derived key, may then be used to encrypt or encode subsequent communications using a symmetric-key cipher. It is further to be understood that ECDH may refer to a variant of the Diffie-Hellman protocol using elliptic-curve cryptography.

As referenced herein, "homomorphic" encryption is a term of art and may refer to a form of encryption that permits users to perform computations on encrypted data without first decrypting it. It is to be understood that the resulting computations of homomorphic encryption are left in an encrypted form which, when decrypted, result in an identical output to that produced had the operations been performed on the unencrypted data. It is also to be understood that the homomorphic encryption can be used for privacy-preserving outsourced storage and computation, which may allow data to be encrypted and out-sourced to commercial cloud environments for processing, all while encrypted. It is further to be understood that an additively homomorphic encryption or cryptosystem may refer to a form of encryption or cryptosystem that, given only the public key and the encryption of message m1 and message m2, one can compute the encryption of m1+m2. For example, the Paillier cryptosystem, which is a probabilistic asymmetric algorithm for public key cryptography, is an additively homomorphic cryptosystem.

As referenced herein, "secret sharing" or "secret splitting" is a term of art and may refer to cryptographic actions or algorithms for generating a secret, breaking the secret into multiple shares, and distributing the shares among multiple parties, so that only when the parties bring together their respective shares can the secret be reconstructed. It is to be understood that secret sharing may refer to actions or algorithms for distributing a secret among a group, in such a way that no individual holds any intelligible information about the secret, but when a sufficient number of individuals combine their "shares", the secret may be reconstructed. It is also to be understood that whereas insecure secret sharing may allow an attacker to gain more information with each share, secure secret sharing may be "all or nothing", where "all" may mean the necessary number of shares.

As referenced herein, "shuffle", "shuffling", "permute", or "permuting" is a term of art and may refer to an action or algorithm for rearranging and/or randomly rearranging the order of the records (elements, rows, etc.) of e.g., an array, a dataset, a database, a data table, etc.

As referenced herein, a "semi-honest" adversary is a term of art and may refer to a party who may try corrupting parties but follow the protocol as specified. It is to be understood that the "semi-honest" party may be a corrupt party that runs a present protocol honestly but may try learning messages received from another party and/or parties for purposes e.g., beyond those intended by the protocol.

FIG. 1 is a schematic view of an example secure computation and communication system 100, arranged in accordance with at least some embodiments described herein.

The system 100 may include terminal devices 110, 120, 130, and 140, a network 160, and a server 150. It is to be understood that FIG. 1 only shows illustrative numbers of the terminal devices, the network, and the server. The embodiments described herein are not limited to the number of the terminal devices, the network, and/or the server described. That is, the number of terminal devices, networks, and/or servers described herein are provided for descriptive purposes only and are not intended to be limiting.

In accordance with at least some example embodiments, the terminal devices 110, 120, 130, and 140 may be various electronic devices. The various electronic devices may include but not be limited to a mobile device such as a smartphone, a tablet computer, an e-book reader, a laptop computer, a desktop computer, and/or any other suitable electronic devices.

In accordance with at least some example embodiments, the network 160 may be a medium used to provide a communications link between the terminal devices 110, 120, 130, 140 and the server 150. The network 160 may be the Internet, a local area network (LAN), a wide area network (WAN), a local interconnect network (LIN), a cloud, etc. The network 160 may be implemented by various types of connections, such as a wired communications link, a wireless communications link, an optical fiber cable, etc.

In accordance with at least some example embodiments, the server 150 may be a server for providing various services to users using one or more of the terminal devices 110, 120, 130, and 140. The server 150 may be implemented by a distributed server cluster including multiple servers or may be implemented by a single server.

A user may use one or more of the terminal devices 110, 120, 130, and 140 to interact with the server 150 via the network 160. Various applications or localized interfaces thereof, such as social media applications, online shopping services, or the like, may be installed on the terminal devices 110, 120, 130, and 140.

It is to be understood that software applications or services according to the embodiments described herein and/or according to the services provided by the service providers may be performed by the server 150 and/or the terminal devices 110, 120, 130, and 140 (which may be referred to herein as user devices). Accordingly, the apparatus for the software applications and/or services may be arranged in the server 150 and/or in the terminal devices 110, 120, 130, and 140.

It is also to be understood that when a service is not performed remotely, the system 100 may not include the network 160, but include only the terminal device 110, 120, 130, and 140 and/or the server 150.

It is further to be understood that the terminal device 110, 120, 130, and 140 and/or the server 150 may each include one or more processors, a memory, and a storage device storing one or more programs. The terminal device 110, 120, 130, and 140 and/or the server 150 may also each include an Ethernet connector, a wireless fidelity receptor, etc. The one or more programs, when being executed by the one or more processors, may cause the one or more processors to perform the method(s) described in any embodiments described herein. Also, it is to be understood that a computer readable non-volatile medium may be provided according to the embodiments described herein. The computer readable medium stores computer programs. The computer programs are used to, when being executed by a processor, perform the method(s) described in any embodiments described herein.

Figure 2:
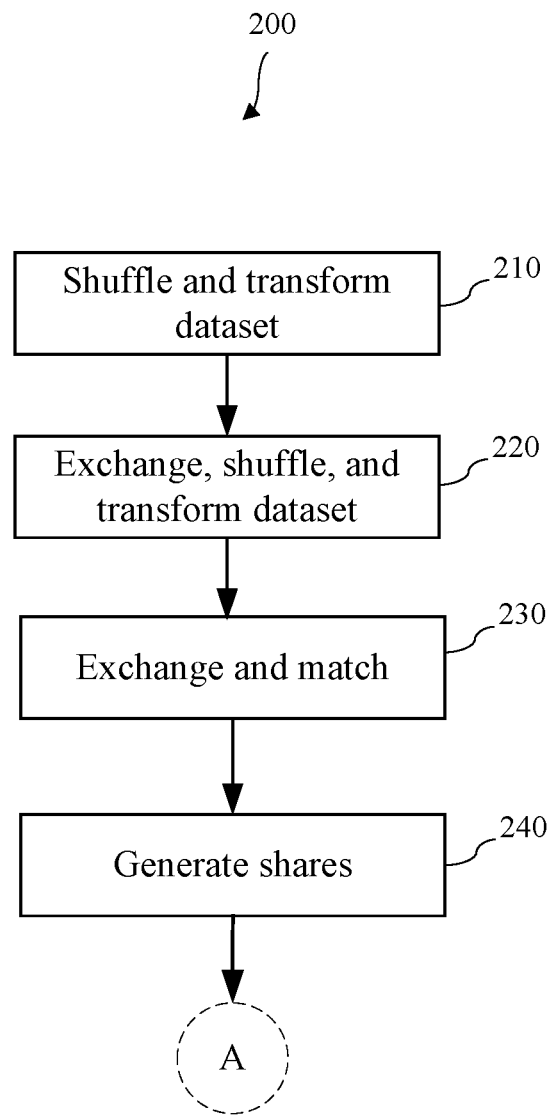
FIG. 2 is a flow chart illustrating an example inner join processing flow for private and secure computations and communication, in accordance with at least some embodiments described herein.
Figure 5A:
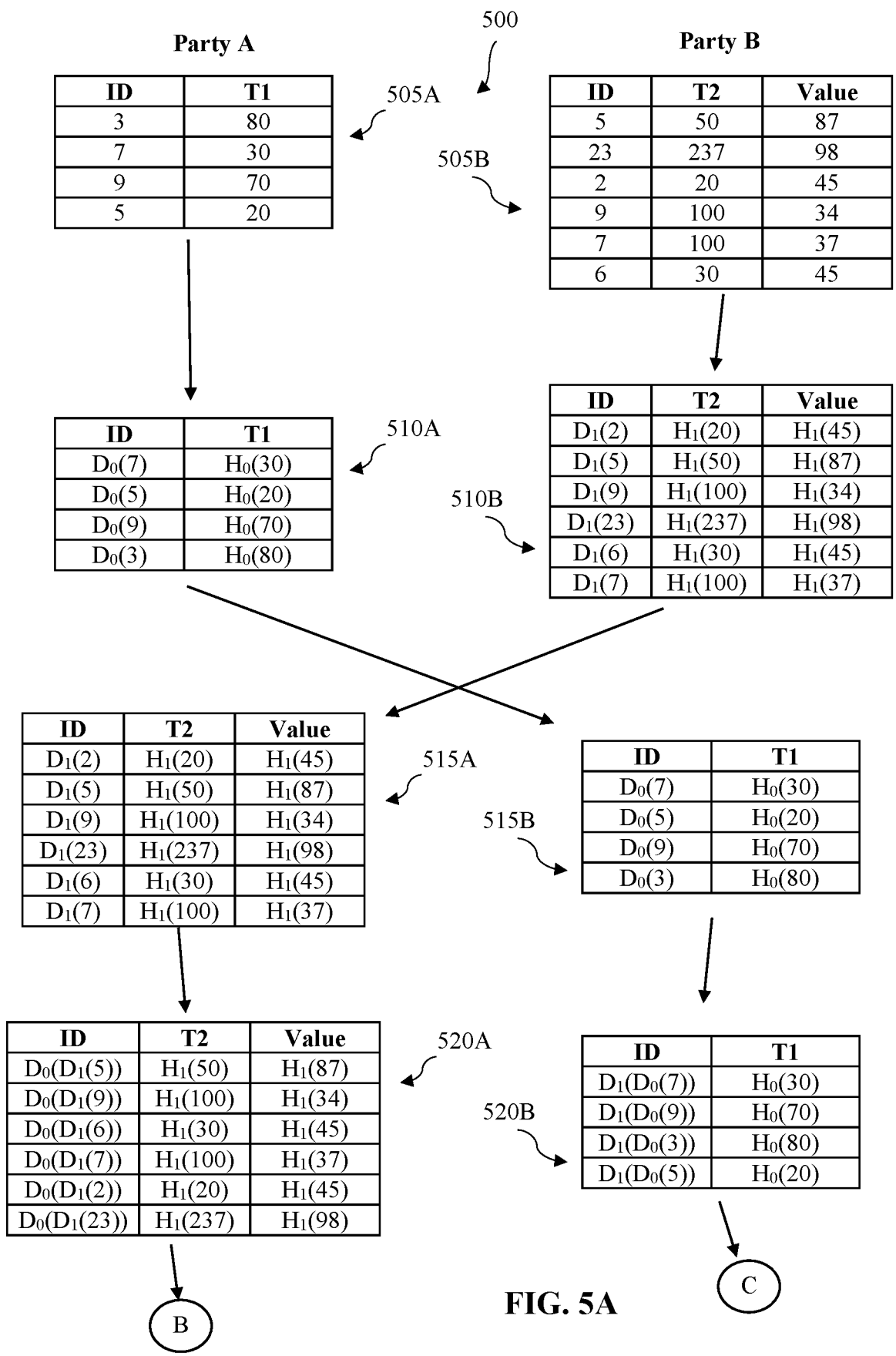
FIG. 5A shows a first portion of a schematic diagram illustrating an example of the processing flow of FIG. 2, in accordance with at least some embodiments described herein.
Figure 5B:
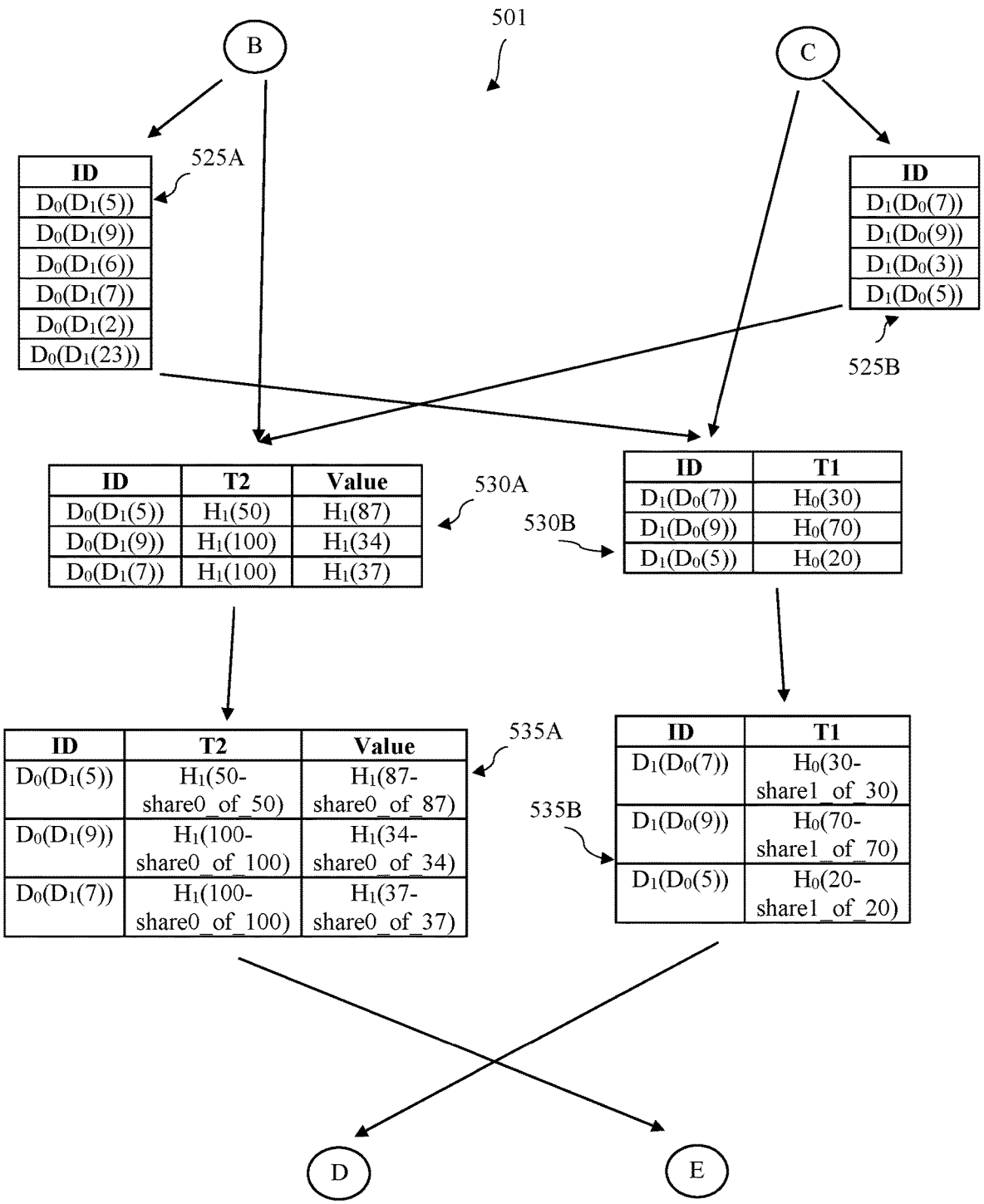
FIG. 5B shows a second portion of a schematic diagram illustrating an example of the processing flow of FIG. 2, in accordance with at least some embodiments described herein.

FIG. 2 is a flow chart illustrating an example inner join processing flow 200 for private and secure computations and communication, in accordance with at least some embodiments described herein. FIG. 5A shows a first portion 500 of a schematic diagram illustrating an example of the processing flow 200 of FIG. 2, in accordance with at least some embodiments described herein. FIG. 5B shows a second portion 501 of a schematic diagram illustrating an example of the processing flow 200 of FIG. 2, in accordance with at least some embodiments described herein.

Figure 6:
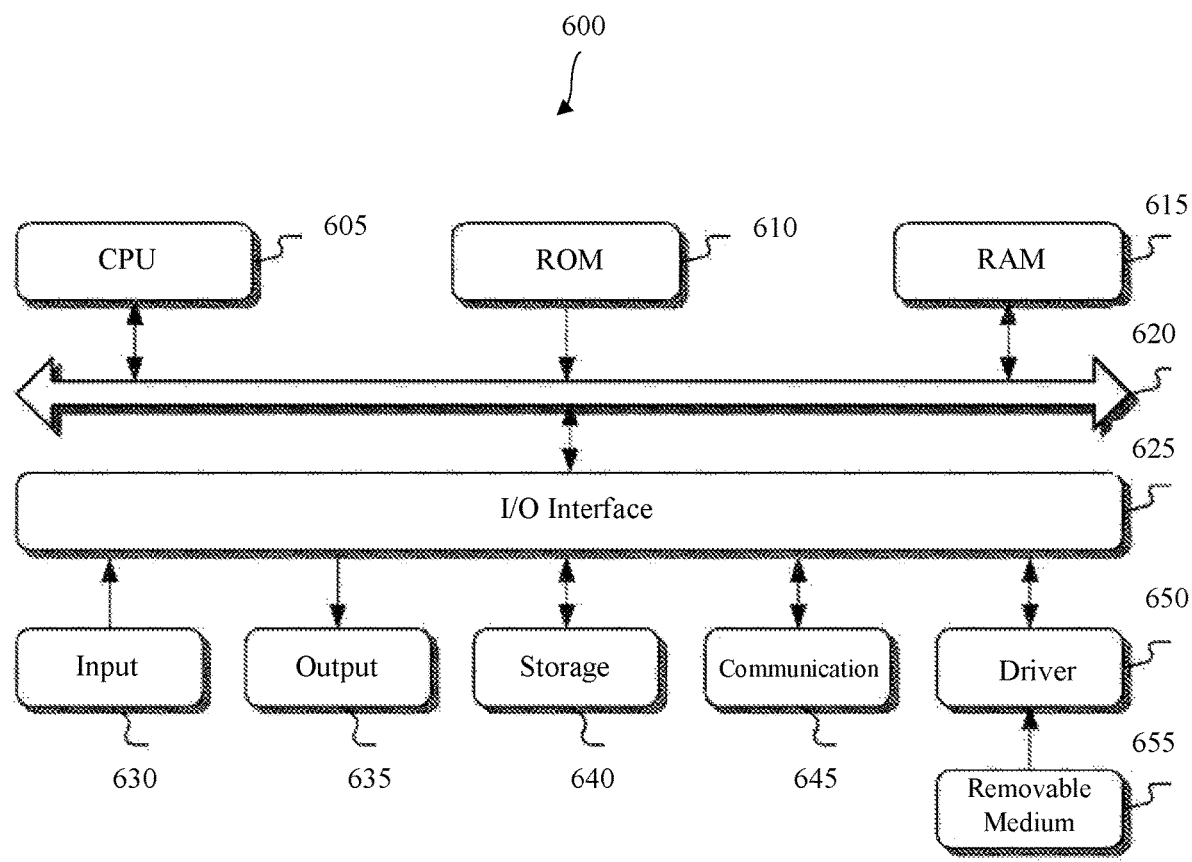
FIG. 6 is a schematic structural diagram of an example computer system applicable to implementing an electronic device, arranged in accordance with at least some embodiments described herein.

It is to be understood that the processing flow 200 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 200 can include one or more operations, actions, or functions as illustrated by one or more of blocks 210, 220, 230, and 240. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 200, operations including initializations or the like may be performed. For example, system parameters and/or application parameters may be initialized. Processing flow 200 may begin at block 210.

At block 210 (Shuffle and transform dataset), the processor may provide a dataset (e.g., 505A of FIG. 5A) for Party A, and/or provide a dataset (e.g., 505B of FIG. 5A) for Party B. In an example embodiment, the size of the dataset 505A or 505B may include tens or hundreds of thousands elements (or records, rows, etc.). It is to be understood that a size of a dataset may refer to the number of elements (or records, rows, etc.) of the dataset. It is to be understood that the size of the dataset 505A may be significantly larger than the size of the dataset 505B.

In an example embodiment, the dataset 505A includes multiple records (rows), each record including a member or membership or user identification (ID) and a time (T1) indicating e.g., the time (e.g., the starting time or timestamp) when the user clicks on e.g., a link or the like on Party A's platform. The dataset 505B includes multiple records (rows), each record including a member or membership or user identification (ID), a time (T2) indicating e.g., the time (e.g., the starting time or timestamp) when the user goes to Party B's website, and a value (Value) indicating the value of the user for Party B. In an example embodiment, the time (or timestamp) is listed in units of "minutes". It is to be understood that the format, content, and/or arrangement of the dataset 505A and/or 505B are for descriptive purposes only and are not intended to be limiting. For example, each dataset 505A or 505B may have one or more IDs (columns) and/or one or more features or attributes (columns) associated with the ID or IDs.

In an example embodiment, Party A and/or Party B may want to find out e.g., (1) how many users who clicked on e.g., a link or the like on Party A's platform and went to Party B's website and made valuable interaction, (2) how many users who clicked on e.g., a link or the like on Party A's platform and went to Party B's website within a certain period of time (e.g., within 70 minutes) after the user clicked on e.g., a link or the like on Party A's platform, and made valuable interaction, and/or (3) the total value of all users who clicked on e.g., a link or the like on Party A's platform and went to Party B's website within a certain period of time (e.g., within 70 minutes) after the users clicked on e.g., a link or the like on Party A's platform and made valuable interaction.

It is to be understood that Party A and/or Party B may not want to reveal to the other party the data in the dataset 505A and/or the dataset 505B, and/or in the intersection of the dataset 505A and the dataset 505B.

At block 210, the processor of the respective device may also shuffle (e.g., randomly permute, etc.) the dataset 505A to obtain or generate the dataset 510A for Party A, and/or shuffle the dataset 505B to obtain or generate the dataset 510B for Party B.

The processor may also transform the ID (column) of the dataset 510A using a transforming scheme for Party A. It is to be understood that the function or operation to "transform" or of "transforming" a dataset or a portion thereof, e.g., one or more columns (or rows) of a dataset such as one or more identification fields/columns (or records/rows), etc., may refer to processing (e.g., encrypting, decrypting, encoding, decoding, manipulating, compressing, decompressing, converting, etc.) the dataset or a portion thereof. It is also to be understood that the "transforming scheme" may refer to an algorithm, protocol, or function of performing the processing (e.g., encrypting, decrypting, encoding, decoding, manipulating, compressing, decompressing, converting, etc.) of the dataset or a portion thereof. In an example embodiment, the processor may encrypt (or decrypt, encode, decode, manipulate, compress, decompress, convert, etc.) the ID of the dataset 510A using e.g., a key of Party A based on an ECDH algorithm or protocol (represented by the function $D_0(\bullet)$).

The processor may also transform the ID of the dataset 510B using a transforming scheme for Party B. In an example embodiment, the processor may encrypt (or decrypt, encode, decode, manipulate, compress, decompress, convert, etc.) the ID of the dataset 510B using e.g., a key of Party B based on the ECDH algorithm or protocol (represented by the function $D_1(\cdot)$).

The processor may further transform T1 (column) of the dataset 510A using a transforming scheme for Party A. In an example embodiment, the processor may encrypt (or decrypt, encode, decode, manipulate, compress, decompress, convert, etc.) T1 of the dataset 510A using e.g., a key of Party A based on an additively homomorphic encryption algorithm or protocol (represented by the function $H_0(\cdot)$).

The processor may also transform T2 (column) and Value (column) of the dataset 510B using a transforming scheme for Party B. In an example embodiment, the processor may encrypt (or decrypt, encode, decode, manipulate, compress, decompress, convert, etc.) the T2 and Value of the dataset 510B using e.g., a key of Party B based on the additively homomorphic encryption algorithm or protocol (represented by the function $H_1(\cdot)$).

It is to be understood that at block 210, for Party A and/or Party B, a sequence of the transforming of the dataset and the shuffling of the dataset may be switched or changed, without impacting the purpose of the resultant dataset. For example, the processor may transform the dataset 505A to obtain or generate the dataset 510A for Party A, and then shuffle the dataset 510A. The processor may also transform the dataset 505B to obtain or generate the dataset 510B for Party B, and then shuffle the dataset 510B. Processing may proceed from block 210 to block 220.

At block 220 (Exchange, shuffle, and transform dataset), the processor of the respective device may exchange the dataset 510A with the dataset 510B between Party A and Party B. For Party A, the processor may dispatch or send the dataset 510A to Party B, and receive or obtain the dataset 510B from Party B as dataset 515A (See FIG. 5A). For Party B, the processor may dispatch or send the dataset 510B to Party A, and receive or obtain the dataset 510A from Party A as dataset 515B (See FIG. 5A). It is to be understood that since the dataset 510A and the dataset 510B have been transformed (e.g., encoded, etc.), the corresponding receiving party may not know the data in the received dataset.

The processor may also shuffle the dataset 515A for Party A to obtain or generate the dataset 520A, and/or shuffle the dataset 515B for Party B to obtain or generate the dataset 520B.

The processor may further transform the ID of the dataset 520A using a transforming scheme for Party A. In an example embodiment, the processor may encrypt (or decrypt, encode, decode, manipulate, compress, decompress, convert, etc.) the ID of the dataset 520A using a key of Party A based on the ECDH algorithm or protocol (represented by the function $D_0(\cdot)$). The processor may further transform the ID of the dataset 520B using a transforming scheme for Party B. In an example embodiment, the processor may encrypt (or decrypt, encode, decode, manipulate, compress, decompress, convert, etc.) the ID of the dataset 520B using a key of Party B based on the ECDH algorithm or protocol (represented by the function $D_1(\cdot)$). It is to be understood that the results of the functions $D_1(D_2(p))$ and $D_2(D_1(p))$ may be the same for a same parameter "p".

It is to be understood that at block 220, for Party A and/or Party B, a sequence of the transforming of the ID of the dataset and the shuffling of the dataset may be switched or changed, without impacting the purpose of the resultant dataset. For example, the processor may transform the dataset 515A to obtain or generate the dataset 520A for Party A, and then shuffle the dataset 520A. The processor may also transform the dataset 515B to obtain or generate the dataset 520B for Party B, and then shuffle the dataset 520B. Processing may proceed from block 220 to block 230.

At block 230 (Exchange and match), the processor of the respective device may extract the ID of the dataset 520A to obtain or generate the dataset 525A for Party A, and/or extract the ID of the dataset 520B to obtain or generate the dataset 525B for Party B. The processor of the respective device may also exchange the dataset 525A with the dataset 525B between Party A and Party B. For Party A, the processor may dispatch or send the dataset 525A to Party B, and receive or obtain the dataset 525B from Party B. For Party B, the processor may dispatch or send the dataset 525B to Party A, and receive or obtain the dataset 525A from Party A.

The processor may also perform search for a match (or an inner join operation, etc.) between the dataset 520A and the dataset 525B to obtain or generate an intersection (dataset 530A of FIG. 5B) for Party A. It is to be understood that the above operation incudes for each identification in the dataset 525B that matches the identification in the dataset 520A, adding or appending the record (or row) of the dataset 520A that contains the matched identification to the dataset 530A.

The processor may also perform search for a match (or an inner join operation, etc.) between the dataset 520B and the dataset 525A to obtain or generate an intersection (dataset 530B of FIG. 5B) for Party B. It is to be understood that the above operation incudes for each identification in the dataset 525A that matches the identification in the dataset 520B, adding or appending the record (or row) of the dataset 520B that contains the matched identification to the dataset 530B.

It is to be understood that for Party A, data in the intersection 530A are also transformed (e.g., encoded, etc.) by Party B (via $D_1(\cdot)$ and $H_1(\cdot)$), and thus Party A may not know the real data in the intersection 530A. For Party B, data in the intersection 530B are also transformed (e.g., encoded, etc.) by Party A (via $D_0(\cdot)$ and $H_0(\cdot)$), and thus Party B may not know the real data in the intersection 530B. That is, the matching or inner join operation conducted, as described above, is a private matching or inner join operation. The processor performs a private identity matching without revealing the intersection of datasets of the two parties. Processing may proceed from block 230 to block 240.

At block 240 (Generate shares), for each attribute or feature (e.g., those elements that are not identifications of the ID field/column) in the dataset 530A for Party A, the processor may generate a corresponding mask (see description of FIG. 4 for details), and may mask (see description of FIG. 4 for details) each attribute or feature in the dataset 530A with its corresponding mask using a masking scheme, to obtain or generate a dataset 535A. In an example embodiment, each mask is a random number or random plaintext. In an example embodiment, the masking scheme is a homomorphic operation or computation (e.g., addition, subtraction, etc.) in an additively homomorphic encryption algorithm or protocol. For example, as shown in FIG. 5B, the processor may mask the T2 data $H_1(50)$ in the dataset 530A with a mask "share0_of_50", and homomorphically compute the T2 data $H_1(50-\text{share0\_of\_50})$ in the dataset 535A by subtracting the mask "share0_of_50" from $H_1(50)$, where the mask "share0_of_50" is generated for and corresponds to the T2 time "50".

The processor may also extract the ID column from the dataset 530A, along with all the masks generated for all the attributes or features (i.e., those elements that are not IDs), to obtain the dataset 540A (see FIG. 5C) for Party A.

Similarly, for each attribute or feature (e.g., those elements that are not identifications of the ID field/column) in the dataset 530B for Party B, the processor may generate a corresponding mask, and may mask each attribute or feature in the dataset 530B with its corresponding mask using a masking scheme, to obtain or generate a dataset 535B. In an example embodiment, each mask is a random number or random plaintext. In an example embodiment, the masking scheme is a homomorphic operation or computation (e.g., addition, subtraction, etc.) in an additively homomorphic encryption algorithm or protocol. For example, as shown in FIG. 5B, the processor may mask the T1 data $H_0(30)$ in the dataset 530B with a mask "share1_of_30", and homomorphically compute the T1 data $H_0(30-share1\_of\_30)$ in the dataset 535B by subtracting the mask "share1_of_30" from $H_0(30)$, where the mask "share1_of_30" is generated for and corresponds to the T1 time "30".

The processor may also extract the ID column from the dataset 530B, along with all the masks generated for all the attributes or features (i.e., those elements that are not IDs), to obtain the dataset 540B (see FIG. 5C) for Party B.

Figure 3:
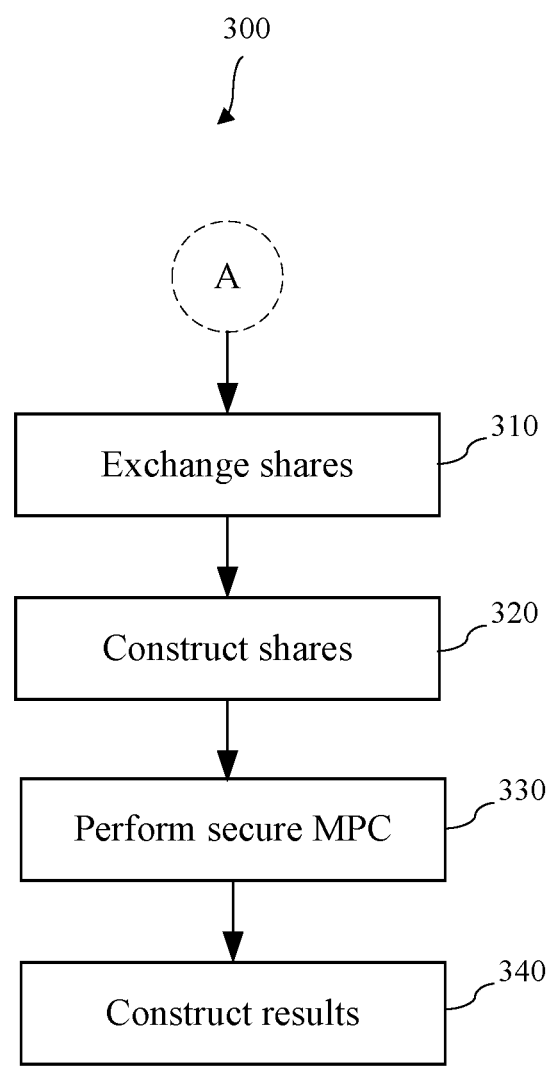
FIG. 3 is a flow chart illustrating an example secret sharing processing flow for private and secure computation and communication, in accordance with at least some embodiments described herein.
Figure 5C:
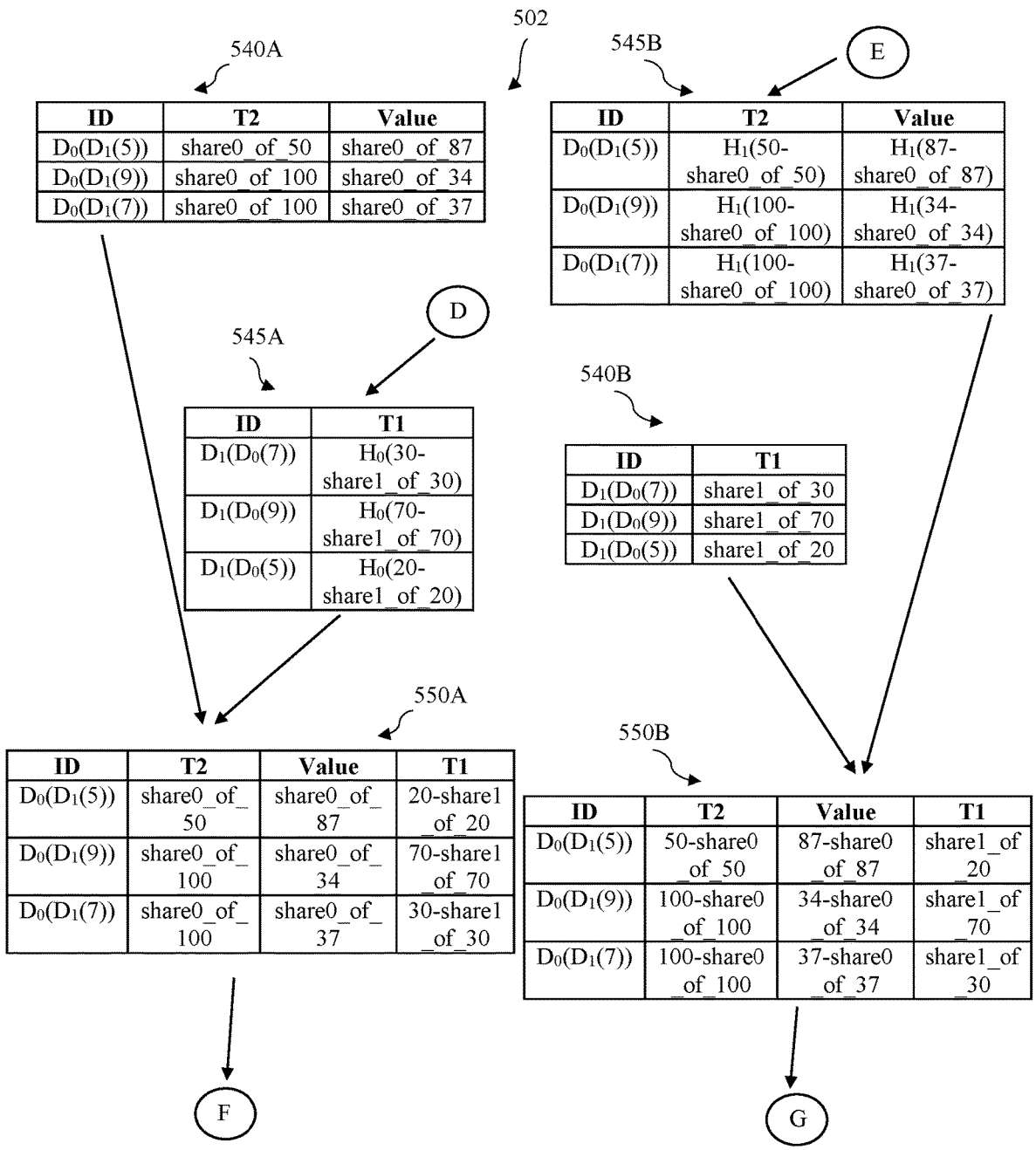
FIG. 5C shows a third portion of a schematic diagram illustrating an example of the processing flow of FIG. 3, in accordance with at least some embodiments described herein.
Figure 5D:
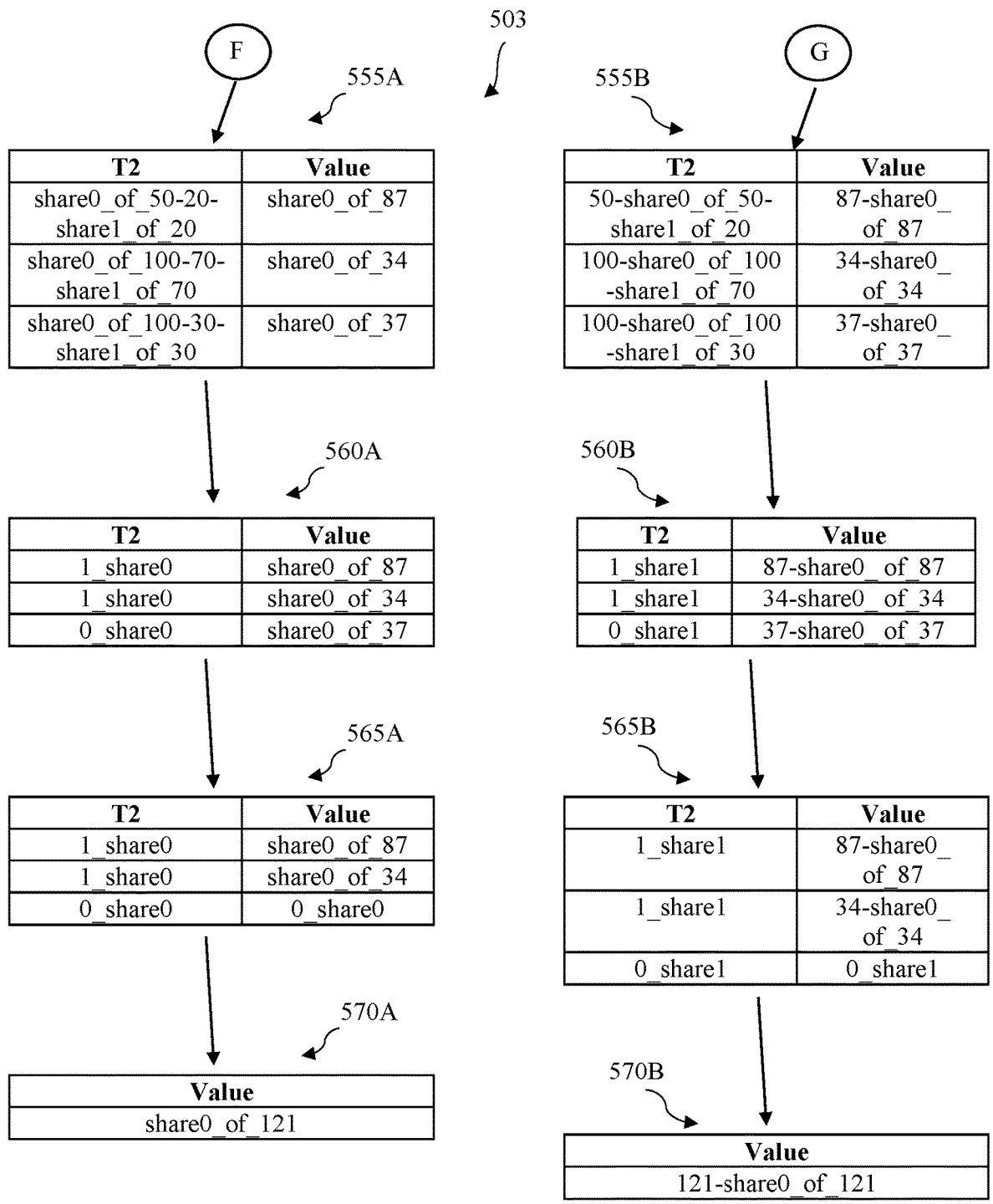
FIG. 5D shows a fourth portion of a schematic diagram illustrating an example of the processing flow of FIG. 3, in accordance with at least some embodiments described herein.

FIG. 3 is a flow chart illustrating an example secret sharing processing flow 300 for private and secure computation and communication, in accordance with at least some embodiments described herein. FIG. 5C shows a third portion 502 of a schematic diagram illustrating an example of the processing flow 300 of FIG. 3, in accordance with at least some embodiments described herein. FIG. 5D shows a fourth portion 503 of a schematic diagram illustrating an example of the processing flow 300 of FIG. 3, in accordance with at least some embodiments described herein.

It is to be understood that the processing flow 300 disclosed herein can be conducted by one or more processors (e.g., the processor of one or more of the terminal device 110, 120, 130, and 140 of FIG. 1, the processor of the server 150 of FIG. 1, the central processor unit 605 of FIG. 6, and/or any other suitable processor), unless otherwise specified.

It is also to be understood that the processing flow 300 can include one or more operations, actions, or functions as illustrated by one or more of blocks 310, 320, 330, and 340. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. It is to be understood that before the processing flow 300, operations including initializations or the like may be performed. For example, system parameters and/or application parameters may be initialized from the results at block 240 of FIG. 2. Processing flow 300 may begin at block 310.

At block 310 (Exchange shares), the processor of the respective device may exchange the dataset 535A with the dataset 535B between Party A and Party B. For Party A, the processor may dispatch or send the dataset 535A to Party B, and receive or obtain the dataset 535B from Party B as dataset 545A (See FIG. 5C). For Party B, the processor may dispatch or send the dataset 535B to Party A, and receive or obtain the dataset 535A from Party A as dataset 545B (See FIG. 5C). Processing may proceed from block 310 to block 320.

At block 320 (Construct shares), the processor may transform the attributes or features (e.g., T1—those elements that are not IDs) of the dataset 545A using a transfer scheme for Party A, and construct the secret shares (dataset 550A) for Party A by combining (e.g., performing a union operation, etc.) the dataset 540A and the transformed attributes or features (e.g., T1—those elements that are not IDs) of the dataset 545A. In an example embodiment, the processor may decrypt (or encrypt, encode, decode, manipulate, compress, decompress, convert, etc.) the attributes or features (e.g., T1—those elements that are not IDs) of the dataset 545A using a key of Party A based on the additively homomorphic encryption algorithm or protocol.

The processor may transform the attributes or features (e.g., T2 and Value—those elements that are not IDs) of the dataset 545B using a transfer scheme for Party B, and construct the secret shares (dataset 550B) for Party B by combining (e.g., performing a union operation, etc.) the dataset 540B and the transformed attributes or features (e.g., T2 and Value—those elements that are not IDs) of the dataset 545B. In an example embodiment, the processor may decrypt (or encrypt, encode, decode, manipulate, compress, decompress, convert, etc.) the attributes or features (e.g., T2 and Value—those elements that are not IDs) of the dataset 545B using a key of Party B based on the additively homomorphic encryption algorithm or protocol. Processing may proceed from block 320 to block 330.

At block 330 (Perform secure MPC), the processor of the respective device may perform secure multi-party computation (see descriptions below) on the secret shares of Party A and/or perform secure multi-party computation (see descriptions below) on the secret shares of Party B.

In an example embodiment, the processor may subtract T1 from T2 for the dataset 550A to obtain or generate the dataset 555A for Party A, and/or subtract T1 from T2 for the dataset 550B to obtain or generate the dataset 555B for Party B.

In an example embodiment, the processor may determine whether T2 is greater than 0 and less than a predetermined value for the dataset 555A to obtain or generate the dataset 560A for Party A. If T2 is greater than 0 and less than a predetermined value, the processor may set the T2 value in the dataset 560A to the secret share of 1 (to represent "True"), which is a random number for Party A. If T2 is not greater than 0 or not less than the predetermined value, the processor may set the T2 value in the dataset 560A to the secret share of 0 (to represent "False"), which is a random number for Party A.

In an example embodiment, the processor may determine whether T2 is greater than 0 and less than a predetermined value for the dataset 555B to obtain or generate the dataset 560B for Party B. If T2 is greater than 0 and less than a predetermined value, the processor may set the T2 value in the dataset 560B to the secret share of 1 (to represent "True"), which is a random number for Party B. If T2 is not greater than 0 or not less than the predetermined value, the processor may set the T2 value in the dataset 560B to the secret share of 0 (to represent "False"), which is a random number for Party B.

In an example embodiment, the processor may also multiply the corresponding T2 and Value of the dataset 560A, and store or save the results in the Value field of the dataset 565A, to generate the dataset 565A for Party A. The processor may also multiply the corresponding T2 and Value of the dataset 560B, and store or save the results in the Value field of the dataset 565B, to generate the dataset 565B for Party B. It is to be understood that the secret share of 1 multiplies any value V may result in the same value V. The secret share of 0 multiplies any value V may result in the secret share of 0.

In an example embodiment, the processor may further sum the Value of the dataset 565A, and store or save the results in the Value field of the dataset 570A, to generate the dataset 570A for Party A. The processor may further sum the Value of the dataset 565B, and store or save the results in the Value field of the dataset 570B, to generate the dataset 570B for Party B. It is to be understood that the secret share of 0 adds any value V may result in the same value V.

It is to be understood that Party A now has the dataset 570A (a secret share) indicating the total value of all users who clicked on e.g., a link or the like on Party A's platform and went to Party B's website, within a certain period of time (e.g., within 70 minutes) after the users clicked on e.g., a link or the like on Party A's platform and made valuable interaction. It is also to be understood that Party A does not know the data in the dataset 570A because the secret share is a random value.

It is to be understood that Party B now has the dataset 570B (a secret share) indicating the total value of all users who clicked on e.g., a link or the like on Party A's platform and went to Party B's website, within a certain period of time (e.g., within 70 minutes) after the users clicked on e.g., a link or the like on Party A's platform and made valuable interaction. It is also to be understood that Party B does not know the data in the dataset 570B because the secret share is a random value. Processing may proceed from block 330 to block 340.

At block 340 (Construct results), the processor of the respective device may exchange the dataset 570A with the dataset 570B between Party A and Party B. For Party A, the processor may dispatch or send the dataset 570A to Party B, and receive or obtain the dataset 570B from Party B. The processor may also construct the results ("121") by e.g., adding data in the dataset 570A and data in the received dataset 570B. That is, the total value of all users who clicked on e.g., a link or the like on Party A's platform and went to Party B's website, within a certain period of time (e.g., within 70 minutes) after the users clicked on e.g., a link or the like on Party A's platform and made valuable interaction, is "121".

For Party B, the processor may dispatch or send the dataset 570B to Party A, and receive or obtain the dataset 570A from Party A. The processor may also construct the results ("121") by e.g., adding data in the dataset 570B and data in the received dataset 570A. That is, the total value of all users who clicked on e.g., a link or the like on Party A's platform and went to Party B's website, within a certain period of time (e.g., within 70 minutes) after the users clicked on e.g., a link or the like on Party A's platform and made valuable interaction, is "121", which is the same as the result determined by Party A.

It is to be understood that other results may also be constructed or determined by combining the secret shares (550A and 550B), the secret shares (555A and 555B), the secret shares (560A and 560B), the secret shares (565A and 565B), etc. For example, the value in T2 column of datasets 555A and/or 555B may be constructed or determined by combining T2 of the secret shares 555A and 555B, and the constructed or determined results may be used to determine the corresponding T2 values in the datasets 560A and/or 560B. It is also to be understood that other results may further be constructed or determined by conducting other MPC computations on the secret shares to get secret shares of the Party A and Party B, and by combining the secret shares of both Party A and Party B.

Figure 4:
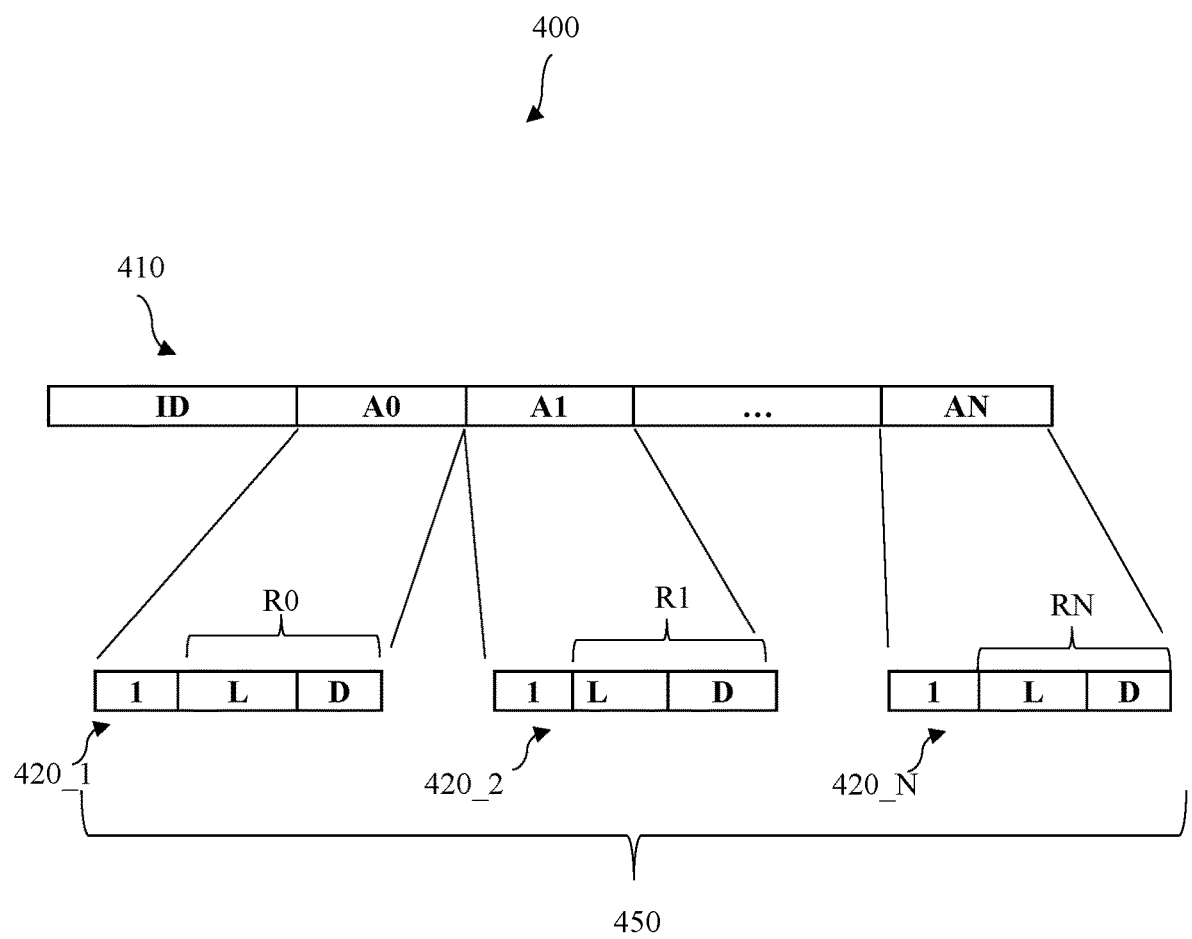
FIG. 4 is a schematic view of an example packing optimization scheme for private and secure computation and communication, in accordance with at least some embodiments described herein.

FIG. 4 is a schematic view of an example packing optimization scheme 400 for private and secure computation and communication, in accordance with at least some embodiments described herein.

As discussed above, at block 240 (Generate shares) of FIG. 2, for each attribute or feature (those elements that are not IDs) in the dataset 530A or 540B (see FIG. 5B), the processor may generate a corresponding mask, and may mask each attribute or feature in the dataset 530A or 530B with its corresponding mask using a masking scheme, to obtain or generate a dataset 535A or 535B. In an example embodiment, each mask is a random number or random plaintext. The processor may also extract the ID column from the dataset 530A or 530B, along with all the masks generated for all the attributes or features, to obtain the dataset 540A or 540B.

In an example embodiment without the packing optimization, given an attribute or feature A0 in a record, the processor may generate its corresponding mask R0. The mask R0 may be a random number or random plaintext. Masking A0 with R0 may refer to adding (or subtracting, etc.) R0 to (or from) A0 such that the result may be a random number or random plaintext (since a value adding or subtracting a random number may result in a random number). In an example embodiment, for T2 value (A0="50") in FIGS. 5B and 5C, its corresponding mask (R0) is represented as share0_of_50. For a ciphertext having a size of 6144 bits with a plaintext space having a size of 3072 bits, without the packing optimization, each value A0 (e.g., having a size of 64 bits, etc.) may occupy a space of 3072 bits during the process.

In FIG. 4, the record 410 (e.g., in the dataset 530A or 530B of FIG. 5B) includes one or more IDs, and one or more attributes or features (i.e., those elements that are not IDs) A0, A1 . . . AN. In an example embodiment, a value of each attribute or feature has a size of L. In an example embodiment, L is 64 bits (i.e., the value ranges from 0 to $2^{64}$). For each attribute or feature A0, A1 . . . . AN, the processor may generate a corresponding mask R0, R1 . . . . RN. Each mask R0, R1 . . . . RN may be a random number or random plaintext (e.g., that is greater than $2^L$) and has a size of L+D bits, where L is the size of A0, A1 . . . . AN, and D is a statistical security parameter (e.g., 40 bits, etc.).

Each attribute or feature A0, A1 . . . . AN may be expanded from L bits to 1+L+D bits (e.g., by adding leading 0s) and be stored in slot 420_1, 420_2, . . . 420_N, respectively. Each slot has a size of 1+L+D bits, with the additional 1 bit (compared with the size of the mask R0, R1 . . . RN) to accommodate overflow when adding or subtracting the corresponding mask R0, R1 . . . RN to or from A0, A1 . . . . AN, respectively.

In an example embodiment, the processor may pack (or combine, concatenate, etc.) two or more attributes or features A0, A1 . . . . AN in the corresponding two or more slots 420_1, 420_2, . . . 420_N, as long as the total size is less than the size of the plaintext space. For example, packing two attributes or features A0 and A1 in the corresponding slots 420_1 and 420_2 may result in a packed attribute or packed feature having a size of 1+L+D+1+L+D bits, where the left/first 1+L+D bits is for A0 in slot 420_1 and the right/second 1+L+D bits is for A1 in slot 420_2.

In an example embodiment, the processor may also expand each mask R0, R1 . . . . RN from L+D bits to 1+L+D bits (e.g., by adding leading 0s) and pack two or more masks R0, R1 . . . RN, as long as the total size is less than the size of the plaintext space. For example, packing two masks R0 and R1 may result in a packed mask having a size of 1+L+D+1+L+D bits, where the left/first 1+L+D bits is for mask R0 and the right/second 1+L+D bits is for mask R1.

With the packing optimization, the result from the packing of the two or more masks R0, R1 . . . . RN may be used as the packed mask for the packed attributes or packed features A0, A1 . . . AN (i.e., the result from the packing of the two or more attributes or features A0, A1 . . . . AN). The processor may mask each packed attribute or packed feature with its corresponding packed mask using a masking scheme (e.g., adding, subtracting, etc.).

It is to be understood that the packing optimization described above may help packing together multiple messages (e.g., multiple attributes or features associated with each user or member identifier) into a single ciphertext and reducing the number of transforms such as encryptions, decryptions, etc. The packing optimization described above may also help reducing the communication complexity.

FIG. 6 is a schematic structural diagram of an example computer system 600 applicable to implementing an electronic device (for example, the server or one of the terminal devices shown in FIG. 1), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like; an output device 635 including a display such as a liquid crystal display (LCD), a speaker, or the like; a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the processes described with reference to the flowcharts of FIGS. 2 and 3 and/or the processes described in other figures may be implemented as computer software programs or in hardware. The computer program product may include a computer program stored in a computer readable non-volatile medium. The computer program includes program codes for performing the method shown in the flowcharts and/or GUIs. In this embodiment, the computer program may be downloaded and installed from the network via the communication device 645, and/or may be installed from the removable medium 655. The computer program, when being executed by the central processing unit (CPU) 605, can implement the above functions specified in the method in the embodiments disclosed herein.

Compared with the existing algorithms, protocols, or systems, testing and/or analysis indicate that with the features in the embodiments disclosed herein, efficiency may be improved, the number of transforming actions or steps (e.g., homomorphic encryptions, decryptions, additions, etc.) may be reduced, and the communication complexity and the computational complexity may be reduced.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for secure computation and communication, the method comprising: transforming identifications of a first dataset using a first transforming scheme; transforming attributes of the first dataset using a second transforming scheme; dispatching the transformed first dataset; receiving a second dataset; transforming identifications of the received second dataset; dispatching the identifications of the transformed received second dataset; receiving a set of identifications; generating a first intersection of the received set of identifications and the transformed received second dataset; generating a first share based on the first intersection; receiving a second share; and constructing a first result based on the first share and the second share.

Aspect 2. The method of aspect 1, further comprising: before dispatching the transformed first dataset, shuffling the transformed first dataset; and before dispatching the identifications of the transformed second dataset, shuffling the transformed second dataset.

Aspect 3. The method of aspect 1 or aspect 2, further comprising: before constructing the first result, manipulating the first share.

Aspect 4. The method of any one of aspects 1-3, wherein the generating of the first share based on the first intersection includes: masking attributes of the first intersection using a masking scheme; dispatching the masked attributes of the first intersection; generating a first portion of the first share using the masking scheme; receiving a second portion of the first share; transforming the second portion of the first share using the second transforming scheme; and generating the first share based on the first portion of the first share and the second portion of the first share.

Aspect 5. The method of aspect 4, wherein a record of the first intersection includes an identification and two or more attribute fields, the method further comprising: expanding each of the two or more attribute fields to a predetermined size; concatenating the expanded two or more attribute fields; and masking the concatenated two or more attribute fields using the masking scheme.

Aspect 6. The method of aspect 5, wherein the masking of the concatenated two or more attribute fields includes adding random values to the expanded two or more attribute fields, respectively.

Aspect 7. The method of any one of aspects 1-6, further comprising: determining a random exponent for the first transforming scheme.

Aspect 8. The method of aspect 7, wherein the transforming of the identifications of the first dataset using the first transforming scheme includes: mapping the identifications of the first dataset to an elliptic curve, and applying exponentiation on the mapped identifications using the random exponent.

Aspect 9. The method of any one of aspects 1-8, further comprising: generating a public key for the second transforming scheme.

Aspect 10. The method of aspect 9, wherein the transforming of the attributes of the first dataset using the second transforming scheme includes: transforming the attributes of the first dataset using the public key.

Aspect 11. The method of any one of aspects 1-10, further comprising: transforming identifications of the second dataset using the first transforming scheme; transforming attributes of the second dataset using the second transforming scheme; dispatching the transformed second dataset; receiving the dispatched first dataset; transforming identifications of the received first dataset; dispatching the identifications of the transformed received first dataset; receiving the dispatched identifications of the transformed received second dataset; generating a second intersection of the received dispatched identifications and the transformed received first dataset; generating the second share based on the second intersection; receiving the first share; and constructing a second result based on the first share and the second share.

Aspect 12. The method of aspect 11, wherein the first result is the same as the second result.

Aspect 13. The method of aspect 11 or aspect 12, wherein identifications of the first intersection match identifications of the second intersection.

Aspect 14. The method of any one of aspects 11-13, further comprising: before dispatching the transformed second dataset, shuffling the transformed second dataset; and before dispatching the identifications of the transformed received first dataset, shuffling the transformed received first dataset.

Aspect 15. A secure computation and communication system, the system comprising: a memory to store a first dataset; a processor to: transform identifications of a first dataset using a first transforming scheme; transform attributes of the first dataset using a second transforming scheme; dispatch the transformed first dataset; receive a second dataset; transform identifications of the received second dataset; dispatch the identifications of the transformed received second dataset; receive a set of identifications; generate a first intersection of the received set of identifications and the transformed received second dataset;

generate a first share based on the first intersection; receive a second share; and construct a first result based on the first share and the second share.

Aspect 16. The system of aspect 15, wherein the processor is to further: before dispatching the transformed first dataset, shuffle the transformed first dataset; and before dispatching the identifications of the transformed received second dataset, shuffle the transformed received second dataset.

Aspect 17. The system of aspect 16, wherein the processor is to further: before constructing the first result, manipulate the first share.

Aspect 18. A non-transitory computer-readable medium having computer-executable instructions stored thereon that, upon execution, cause one or more processors to perform operations comprising: transforming identifications of a first dataset; transforming attributes of the first dataset; dispatching the transformed first dataset; receiving a second dataset; transforming identifications of the received second dataset; dispatching the identifications of the transformed received second dataset; receiving a set of identifications; generating a first intersection of the received set of identifications and the transformed received second dataset; generating a first share based on the first intersection; receiving a second share; and constructing a first result based on the first share and the second share.

Aspect 19. The computer-readable medium of aspect 18, wherein the operations further comprise: before dispatching the transformed first dataset, shuffling the transformed first dataset; and before dispatching the identifications of the transformed received second dataset, shuffling the transformed received second dataset.

Aspect 20. The computer-readable medium of aspect 19, wherein the operations further comprise: before constructing the first result, manipulating the first share.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A method for secure computation and communication, the method comprising:
    transforming identifications of a first dataset using a first transforming scheme and then a third transforming scheme so that the identifications of the first dataset are transformed twice;
    transforming attributes of the first dataset using a second transforming scheme
    transforming identifications of a second dataset using the third transforming scheme and then the first transforming scheme so that the identifications of the second dataset are transformed twice;
    generating a first intersection of the identifications of the transformed first dataset and the transformed second dataset;
    after the first intersection being generated, generating a first share based on the generated first intersection by applying a masking scheme to attributes of the generated first intersection;
    generating a second intersection of the identifications of the transformed second dataset and the transformed first dataset;
    generating a second share based on the second intersection; and
    constructing a first result based on the first share and the second share.

2. The method of claim 1, further comprising:
    before transforming the first dataset using the third transforming scheme, shuffling the transformed first dataset; and
    before transforming the second dataset using the first transforming scheme, shuffling the transformed second dataset.

3. The method of claim 1, wherein the generating of the first share based on the generated first intersection includes:
    masking the attributes of the generated first intersection using the masking scheme;
    dispatching the masked attributes of the generated first intersection;
    generating a first portion of the first share using the masking scheme;
    receiving a second portion of the first share;
    transforming the second portion of the first share using the second transforming scheme used for transforming the attributes of the first dataset; and
    generating the first share based on the first portion of the first share and the second portion of the first share.

4. The method of claim 1, wherein a record of the generated first intersection includes an identification field and two or more attribute fields, the method further comprising:
    expanding each of the two or more attribute fields to a predetermined size;
    storing the expanded two or more attribute fields in two or more adjacent slots, respectively;
    concatenating the two or more adjacent slots; and
    masking the concatenated two or more adjacent slots using the masking scheme.

5. The method of claim 4, wherein the masking of the concatenated two or more adjacent slots includes adding random values to the two or more adjacent slots, respectively.

6. The method of claim 1, further comprising:
    determining a random exponent for the first transforming scheme.

7. The method of claim 6, wherein the transforming of the identifications of the first dataset using the first transforming scheme includes:
    mapping the identifications of the first dataset to an elliptic curve, and
    applying exponentiation on the mapped identifications using the random exponent.

8. The method of claim 1, further comprising:
    generating a public key for the second transforming scheme.

9. The method of claim 8, wherein the transforming of the attributes of the first dataset using the second transforming scheme includes:

transforming the attributes of the first dataset using the public key.

10. The method of claim 1, further comprising:
transforming attributes of the second dataset using a fourth transforming scheme;
receiving the first share; and
constructing a second result based on the first share and the second share.

11. The method of claim 10, wherein the first result is the same as the second result.

12. The method of claim 10, wherein identifications of the generated first intersection match identifications of the second intersection.

13. The method of claim 10, further comprising:
before transforming the second dataset using the third transforming scheme, shuffling the second dataset; and
before transforming the first dataset using the first transforming scheme, shuffling the first dataset.

14. The method of claim 1, further comprising:
before transforming the identifications of the first dataset using the third transforming scheme, dispatching the first dataset having the identifications of the first dataset being transformed using the first transforming scheme and the attributes of the first dataset being transformed using the second transforming scheme.

15. The method of claim 1, further comprising:
shuffling the first dataset twice before generating the first intersection.

16. The method of claim 1, wherein the attributes of the first intersection include attributes of the second dataset, but not the attributes of the first dataset.

17. A secure computation and communication system, the system comprising:
a memory to store a first dataset; and
a processor to:
transform identifications of the first dataset using a first transforming scheme and then a third transforming scheme so that the identifications of the first dataset are transformed twice;
transform attributes of the first dataset using a second transforming scheme
transform identifications of a second dataset using the third transforming scheme and then the first transforming scheme so that the identifications of the second dataset are transformed twice;
generate a first intersection of the identifications of the transformed first dataset and the transformed second dataset;
after the first intersection being generated, generate a first share based on the generated first intersection by applying a masking scheme to attributes of the generated first intersection;

generating a second intersection of the identifications of the transformed second dataset and the transformed first dataset;
generating a second share based on the second intersection; and
construct a first result based on the first share and the second share.

18. The system of claim 17, wherein the processor is to further:
before transforming the first dataset using the third transforming scheme, shuffle the transformed first dataset; and
before transforming the second dataset using the first transforming scheme, shuffle the transformed second dataset.

19. A non-transitory computer-readable medium having computer-executable instructions stored thereon that, upon execution, cause one or more processors to perform operations comprising:
transforming identifications of a first dataset using a first transforming scheme and then a third transforming scheme so that the identifications of the first dataset are transformed twice;
transforming attributes of the first dataset using a second transforming scheme
transforming identifications of a second dataset using the third transforming scheme and then the first transforming scheme so that the identifications of the second dataset are transformed twice;
generating a first intersection of the identifications of the transformed first dataset and the transformed second dataset;
after the first intersection being generated, generating a first share based on the generated first intersection by applying a masking scheme to attributes of the generated first intersection;
generating a second intersection of the identifications of the transformed second dataset and the transformed first dataset;
generating a second share based on the second intersection; and
constructing a first result based on the first share and the second share.

20. The computer-readable medium of claim 19, wherein the operations further comprise:
before transforming the first dataset using the third transforming scheme, shuffling the transformed first dataset; and
before transforming the second dataset using the first transforming scheme, shuffling the transformed second dataset.

* * * * *